(12) United States Patent
Killick et al.

(10) Patent No.: US 9,106,943 B2
(45) Date of Patent: Aug. 11, 2015

(54) SHARING OF SUBSCRIBER-RECORDED DIGITAL VIDEO RECORDER CONTENT

(75) Inventors: Raynald Killick, Alpharetta, GA (US); Nadine Guillaume, Lawrenceville, GA (US); Vivek Srivastav, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 13/100,421

(22) Filed: May 4, 2011

(65) Prior Publication Data
US 2012/0284765 A1 Nov. 8, 2012

(51) Int. Cl.
| H04N 7/16 | (2011.01) |
| H04N 21/274 | (2011.01) |
| H04N 21/4147 | (2011.01) |
| H04N 21/845 | (2011.01) |

(52) U.S. Cl.
CPC ......... *H04N 21/274* (2013.01); *H04N 21/4147* (2013.01); *H04N 21/8456* (2013.01)

(58) Field of Classification Search
CPC ................... H04N 21/42676; H04N 21/6168; H04N 21/6118; H04N 21/4334; H04N 21/4325; H04N 5/76
USPC .................. 725/111, 114–116, 134, 138, 142, 725/144–147, 153
See application file for complete search history.

(56) References Cited

U.S. PATENT DOCUMENTS

| 6,795,639 | B1 * | 9/2004 | Lord ............................. 386/291 |
| 2003/0208693 | A1 * | 11/2003 | Yoshida ........................ 713/201 |
| 2004/0078819 | A1 * | 4/2004 | Sawada et al. .................. 725/58 |
| 2006/0075449 | A1 | 4/2006 | Jagadeesan et al. |
| 2007/0094702 | A1 * | 4/2007 | Khare et al. .................. 725/134 |
| 2009/0217318 | A1 | 8/2009 | VerSteeg et al. |
| 2009/0248794 | A1 * | 10/2009 | Helms et al. .................. 709/203 |
| 2009/0259730 | A1 * | 10/2009 | Machida et al. .............. 709/219 |
| 2009/0285391 | A1 * | 11/2009 | Johnson et al. ............... 380/200 |
| 2009/0300673 | A1 * | 12/2009 | Bachet et al. ................... 725/31 |
| 2010/0199123 | A1 | 8/2010 | Cohen |
| 2010/0242079 | A1 | 9/2010 | Riedl et al. |

FOREIGN PATENT DOCUMENTS

WO    WO2010084076    * 7/2010

OTHER PUBLICATIONS

Christopher Mims, Access Any Hard Drive from the Internet, Popular Science, Apr. 6, 2009, (3 pages).
David Coursey, Got Extra USB Drives? Updated Pogoplug Puts them to Use, PCWorld, Nov. 20, 2009, (2 pages).

(Continued)

*Primary Examiner* — Yassin Alata
(74) *Attorney, Agent, or Firm* — Edell, Shapiro & Finnan, LLC

(57) ABSTRACT

Digital data associated with recorded programs are uploaded to a Head End facility from user devices (e.g., set-top boxes) in a media distribution network. The Head End facility stores a library of the Digital Video Recording (DVR) assets for programs and makes them available, by streaming, to user devices, including user devices that do not have DVR capability. Techniques are also provided to efficiently upload a DVR asset simultaneously in segments or chunks from multiple user devices.

24 Claims, 9 Drawing Sheets

(56) References Cited

OTHER PUBLICATIONS

MvixUSA, Solutions for the HD Planet, High Definition (1080p) Media Center w/ PRV, Mvix Ultio Pro (MX800 HD) product specifications, 2010, (2 pages).

Network Personal Video Recorder (nPVR), Tandberg Television, IPTV Industry, Tandberg Television and Arroyo Video Solutions Announce nPVR and Advertising On-Demand Solutions, Apr. 9, 2006, (2 pages).

The Mossberg Solution: Testing Popoplug, Get Your Storage out of the Cloud, Feb. 23, 2010, (5 pages).

White Paper: How BitTorrent Works, Maximum PC, How Peer to Peer file-sharing networks work, Jul. 10, 2009, (4 pages).

* cited by examiner

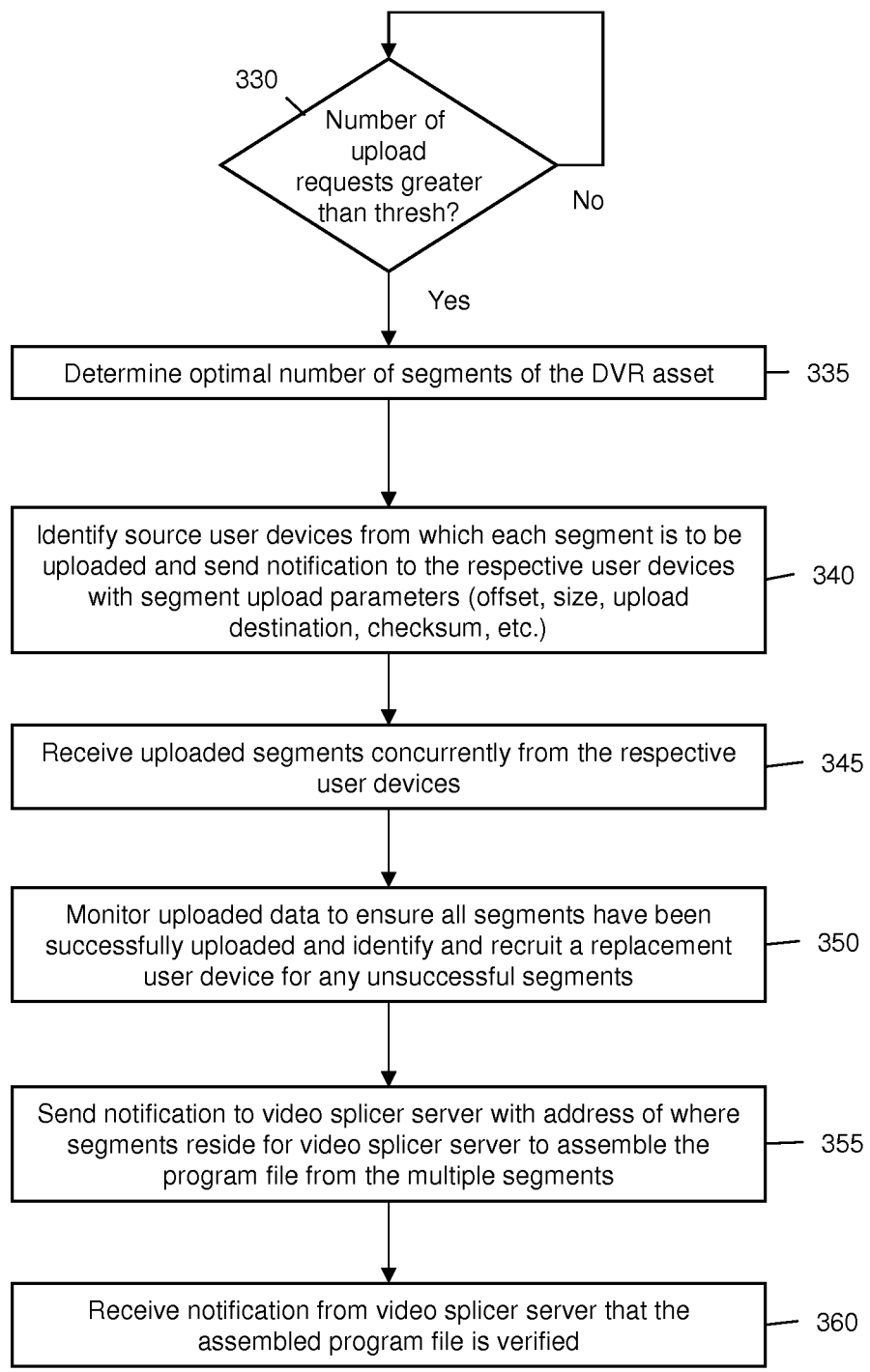

SHARING OF SUBSCRIBER-RECORDED DIGITAL VIDEO RECORDER CONTENT

TECHNICAL FIELD

The present disclosure relates to recording and sharing recorded video content.

BACKGROUND

In media distribution systems, such as a cable, and satellite or Internet-based systems, users can record broadcast programs using a Digital Video Recorder (DVR) function of a user's set-top terminal. The digital data for the recorded program is stored locally in a user's set-top terminal or at some auxiliary storage unit. The user that recorded the program is then free to view the program at any time. However, the recorded program can be viewed only on the user device that recorded it, and only by the user who has access to that user device.

BRIEF DESCRIPTION OF THE DRAWINGS

FIG. 9 is a flow chart depicting in more detail the operations performed at the network controller for the segmented uploading procedure.

DESCRIPTION OF EXAMPLE EMBODIMENTS

Overview

From the perspective of a head end facility, a method is provided that involves receiving a notification from a first user device in a media distribution network, the notification including information recording of a broadcast program at the first user device. A determination is made as to whether digital data for the recorded program has already been uploaded to the head end facility. A notification is sent to the first user device to schedule a time for uploading the digital data for the recorded program to the head end facility from the first user device when it is determined that the recorded program has not already been uploaded to the head end facility. The digital data for the recorded program is received (uploaded) from the first user device at the scheduled time and stored.

From the perspective of a user device, a method is provided involving sending a notification to a head end facility associated with a media distribution network, the notification including information identifying the a broadcast program that is to be recorded (at some time in the future) or that has been recorded at the user device. The user device receives from the head end facility a notification indicating whether digital data for the recorded program has already been uploaded. The user device stores an identifier for the program in a list for a user at the user device for subsequent use in requesting streaming of the digital data for the recorded program from the head end facility when the notification received from the head end facility indicates that the digital data for the recorded program has already been uploaded.

Example Embodiments

Figure 1:
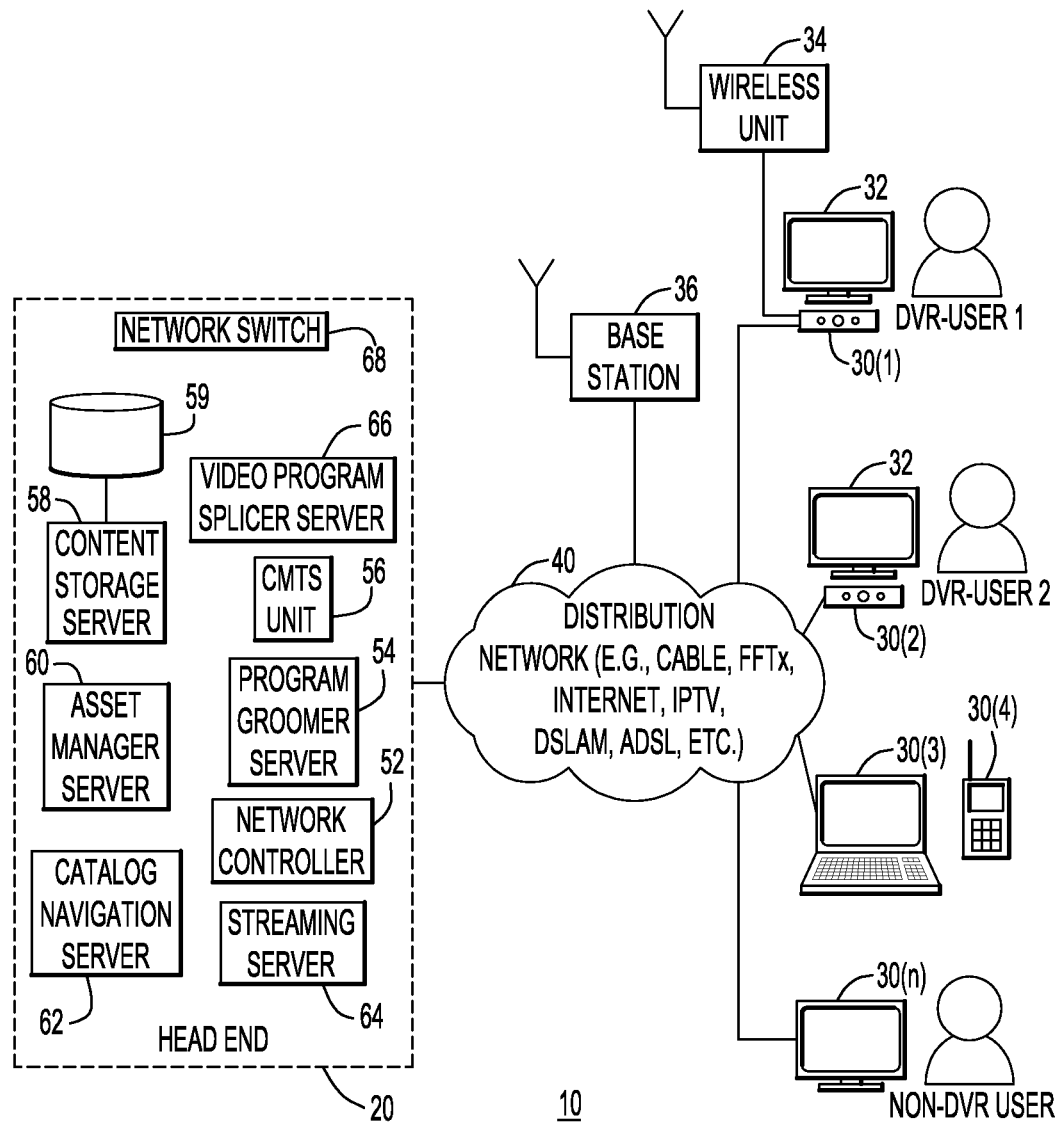
FIG. 1 is a block diagram of a media distribution network in which broadcast programs recorded by users can be uploaded and shared with other users.

Referring first to FIG. 1, a media distribution network is shown generally at reference numeral 10 comprising a Head End (HE) facility 20 and a plurality of user devices or terminals 30(1)-30(n) that receive media from the HE facility 20 over a network 40. According to the configurations and operations described herein, a capability is provided for user devices to upload to the HE facility 20 digital video content of programs (e.g., broadcast programs) recorded at the user devices. The HE facility 20 can then stream or download this content to user devices upon request. The digital video content recording made at a user device is referred to herein as a Digital Video Recording (DVR) content or asset, and may be created by way of a DVR operation performed on a user device.

Unlike network personal video recording technology, according to the techniques described herein, the content recorded and stored at the service provider's HE facility is content that is stored by a user's DVR function. There is no capability heretofore known in which encrypted content created by and stored on a user's DVR unit is uploaded to the HE facility. Copies of a broadcast program recorded on a user device (set-top box) are uploaded to the HE facility as opposed to the service provider HE facility recording the content for subscribers. The DVR asset recorded at a user device is uploaded to the HE facility by an upstream channel in the cable network or through a high-speed wireless link.

The network 40 comprises a cable distribution network that, for example, supports the Data Over Cable Service Interface Specification (DOCSIS) and/or a wide area network, e.g., the Internet. The network 40 may also include one or more satellite transmitters that transmit satellite signals containing broadcast programs to user devices. In other forms, the network 40 may comprise an Internet Protocol Television (IPTV) network, Fiber-to-the-x (FFTx, a generic term for any broadband network architecture that uses optical fiber to replace all or part of the usual metal local loop used for last mile telecommunications), a Digital Subscriber Access Multiplexed (DSLAM) network, an Asymmetric Digital Subscriber Line (ADSL), etc. The user devices 30(1)-30(n) may vary. For example, user devices 30(1) and 30(2) are set-top box devices that connect to displays or televisions 32. User devices 30(1) and 30(2) have Digital Video Recording (DVR) capabilities as described further hereinafter. On the other hand, user device 30(3) is a laptop computer and user device 30(4) is a hand-held mobile communication device, e.g., a cellular mobile phone with data and display capabilities. User device 30(n) comprises a display unit (with an internal receiver for receiving media and transmitter for upstream communication capabilities) but without DVR capabilities of user devices 30(1) and 30(2). For purposes of the foregoing examples described herein, a user associated with the user device 30(1) is referred to as DVR-User1 and a user associated with user device 30(2) is referred to as DVR-User2. A DVR user is a user who has recorded a program and wishes to upload it to the HE facility 20. By contrast, a user associated with user device 30(n) is a non-DVR User insofar as the user device 30(n) does not have DVR capabilities, but can receive and present a recorded program made by a DVR user.

DVR-User1 and DVR-User2 are subscribers to a media distribution network in which broadcast programming and other content (video-on-demand, etc.) is distributed to user devices 30(1) and 30(2) from the HE facility via the network 40. Non-DVR User associated with user device 30(2) is also a subscriber to the media distribution network but lacks the DVR capability. Any subscriber to the media distribution network may have more than one user device to which he/she wishes to receive media content. For example, user devices 30(3) and 30(4) may be devices owned or controlled DVR-User1 or DVR-User2.

One or more of the user devices may have a wireless communication capability to send data, e.g., upload DVR content, to the HE facility 20. To this end, FIG. 1 shows that user device 30(1) comprises a wireless unit 34 that has wireless wide area network (WWAN) capability to wirelessly communicate in a cellular wireless network that includes base stations, one of which is shown at reference numeral 36. For example, the wireless unit 34 is configured to communicate according to any of a variety of wireless communication standards, such as GSM, 3G, 4G or LTE capable wireless unit. The base station 36 is in turn connected to back-end server equipment managed by a wireless communications service provider, which is in turn connected by the Internet (represented by network 40) to the HE facility 20. Thus, a user device such as user device 30(1) that is equipped with such a wireless unit can upload data wirelessly part of the way to the HE facility 20 rather than using an upstream DOCSIS channel for uploading data to the HE facility 20.

The HE facility 20 is capable of delivering a variety of services to user devices, including broadcast programs, video on-demand programs, Internet connectivity, etc. To this end, the HE facility 20 comprises a network controller 52, a program groomer server 54 and a Cable Modem Termination System (CMTS) unit 56 to provide DOCSIS upstream and downstream communications. The HE facility 20 further comprises several components/functions to support the uploading and distribution of DVR content recorded by users, including a content storage server 58 and associated content database 59, an asset manager server 60, a catalog navigation server 62, a streaming server 64 and a video program splicer server 66. These various servers may be implemented by software executed on separate computing devices or they may be software processes implemented on a common or shared computing device. There is also a network switch 68 that provides Internet and local area network connectivity for the various components of the HE facility 20.

The network controller 52 serves as the overall controller for the HE facility 20 and controls the various components in the HE facility 20. A block diagram of the network controller 52 is described hereinafter in connection with FIG. 2. The program groomer server 54 formats broadcast program(s) received from a satellite or other source for the different user receivers. The processed programs would then be provided to the streamer server(s) 64 for streaming to end-user receivers. A program guide is provided by an electronic program guide (EPG) provider independent of the presence of the program streams in the network. The program guide is delivered to user devices to enable users to make selections of programs from the program guide and perform various other functions in connection with the program guide. The CMTS unit 56 is device that provides high speed data services, such as cable Internet or Voice-over Internet Protocol services, to subscribers. The CMTS unit 56 handles communication downstream from the HE facility 20 to user devices and upstream from user devices to the HE facility 20. The network controller 52 communicates with the user devices over DOCSIS via the CMTS 56 or Out-of-Band bridge device, or by way of the Internet.

The content storage server 58 and associated content database 59 store DVR program content uploaded from user devices, for subsequent streaming or downloading to user devices upon request. The content database 59 may comprise an array of hard disk drives or similar large capacity data storage units/devices. The asset manager server 60 includes capabilities to encrypt, decrypt, and transcode uploaded DVR content. For example, a given DVR asset may be transcoded into different data rate/types for different end user devices. The catalog navigation server 62 generates a catalog listing all of the DVR assets that have been uploaded and are available to users in the media distribution network. The catalog or library of DVR assets may be transmitted or made available to users through a program guide type presentation or by posting the listing on a web page that is accessed by user devices, for example.

The streaming server 64 receives requests for a DVR asset (routed to it by the network controller 52) from a user device and in response, retrieves the DVR asset from the content storage server 58, and in response to an appropriate command from the network controller 52, streams the digital data for the DVR asset to the requesting user device via the traditional service providers' transports, such as by Quadrature Amplitude Modulation (QAM), DSLAMs, etc. or downloaded via the Internet.

The video program splicer server 66 splices together segments or chunks of a DVR asset uploaded simultaneously from multiple user devices to reconstruct DVR asset for storage and subsequent streaming to requesting user devices. This aspect of the uploading process is described hereinafter in connection with FIGS. 7-9.

While FIG. 1 shows that the various components that are provided to support the uploading and re-distribution of DVR assets are included within the HE facility 20, this is not meant to be limiting. Many of these components may reside at any location and need not be co-resident with the HE facility itself. For example, some of these functions may be implemented on server devices that reside remote from the HE facility and to which communication is made via the Internet. For example, when a DVR asset is uploaded from a user device, the DVR asset may be uploaded to a content storage server 58 and associated database 59 that is at another location but which is managed or controlled, via commands sent over the Internet, by the network controller 52 at another location. Thus, each of the components shown within the dotted line circumscribing the HE facility 20 need not be physically located in the HE facility proper. Moreover, many of the operations depicted as part of the HE facility 20 may be implemented in a virtual data center/cloud computing environment.

The network controller 52 operates as a server control point with respect to a plurality of user devices that are subscribed for operation in a media distribution network. To this end, the user devices are thus viewed as "client" devices to the network controller 52. Some devices such as Smartphones, tablet computers, etc., can also be "unmanaged" (as opposed to standard set-top boxes that are "managed"), meaning they can operate within the service provider network via an application that that discloses the user's registered identity. The HE facility would authenticate the user in this case and enable the application on the user device to manage recordings. Such unmanaged devices may enable subscribers to control service delivery of DVR assets.

Figure 2:
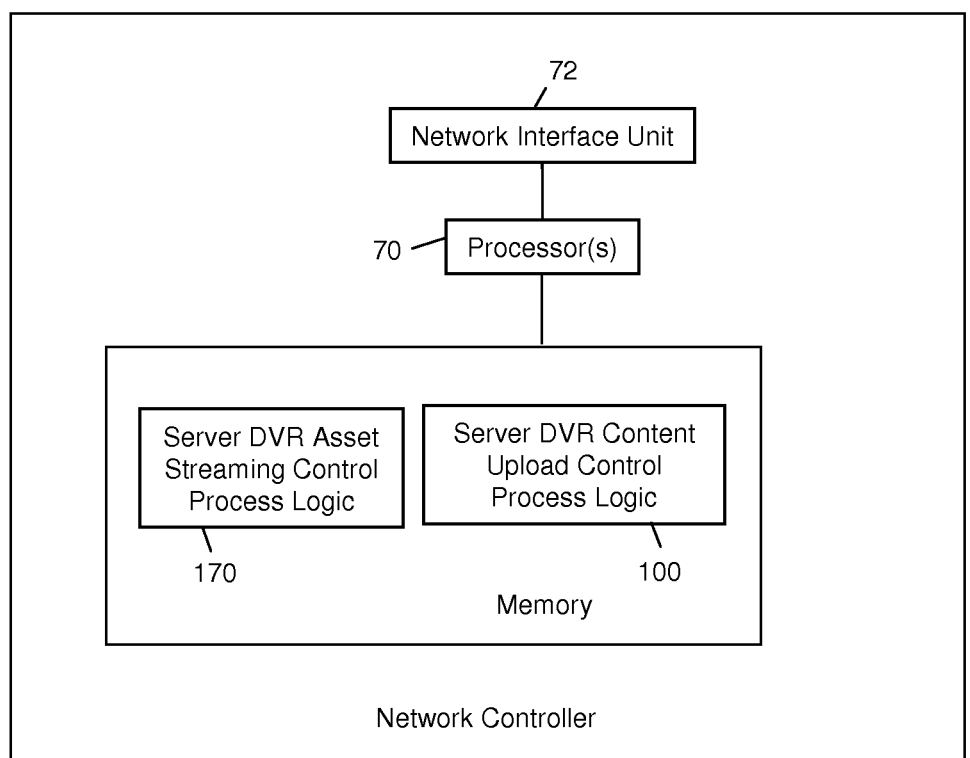
FIG. 2 is a block diagram of an example of a network controller at a Head End facility configured to allow users to share recorded programs in the media distribution network.

Reference is now made to FIG. 2. FIG. 2 is a block diagram of the network controller 52, which as explained above in connection with FIG. 1, serves as the main controller for the HE facility 20 in connection with the DVR asset upload techniques described herein. The network controller 52 is a computing device (e.g., physical server or a virtual machine process running in a data center) that includes one or more processors 70, a network interface unit 72 to enable communications over a local area network and wide area network (e.g., the Internet) and a memory 74. The network interface unit 72 enables the network controller 52 to communicate with the other servers and components shown in FIG. 1 if direct connections between the servers/components are not employed. The memory 74 stores software instructions that are executed by the processor(s) 70 to perform various operations in connection with the DVR asset upload techniques. To this end, the memory 74 stores or is otherwise encoded with instructions for server DVR asset upload control process logic 100. In addition, the memory 74 stores instructions for server DVR asset streaming control process logic 170. The operations of the server DVR asset upload control process logic 100 are described hereinafter in connection with FIGS. 4A, 4B and 7-9. The operations of the DVR asset streaming control process logic 170 are described in connection with FIG. 5. In another form, the DVR asset streaming control process logic 170 is performed by the streaming server 64 shown in FIG. 1. As explained above, in one form, the network controller 52 communicates with the user devices over DOCSIS via the CMTS unit 56, and in another form, the network controller 52 communicates with the user devices via the Internet.

Figure 3:
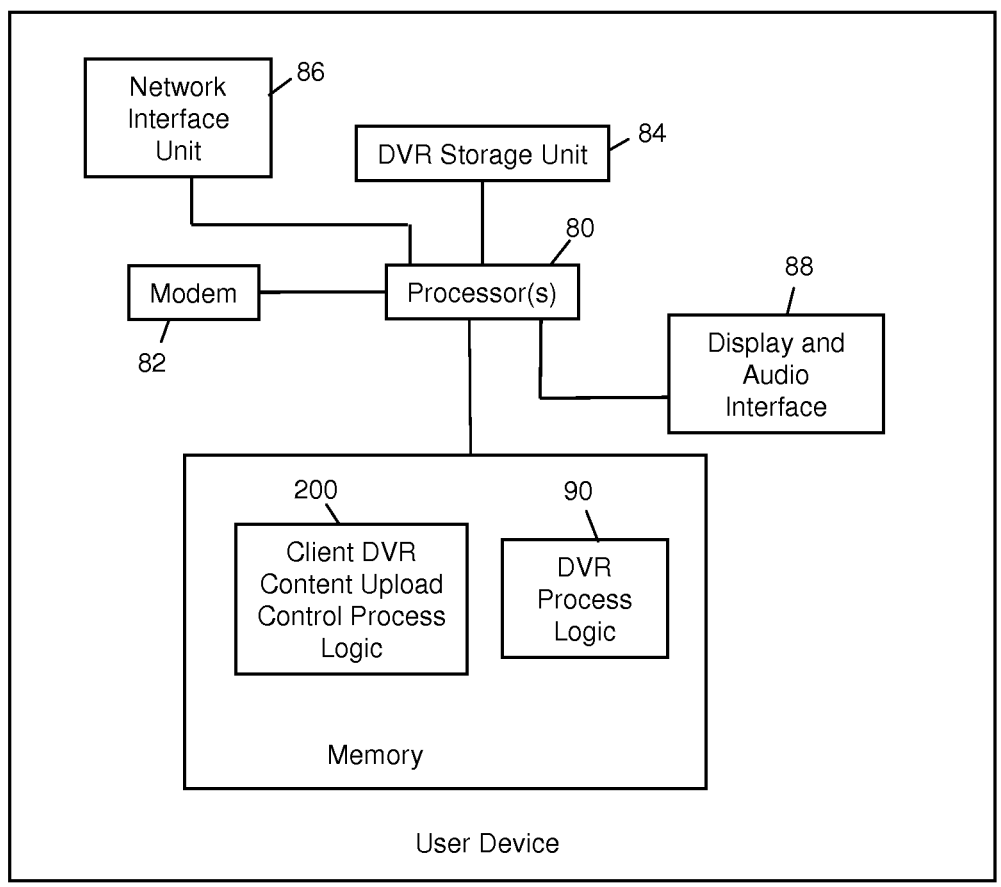
FIG. 3 is diagram depicting an example of a user device that is configured to upload recorded programs to the Head End facility.

Reference is now made to FIG. 3 for a description of a block diagram of a user device that is configured to upload DVR assets. The user device shown in FIG. 3 is labeled with reference numeral 30(i) and is meant to refer to any of the plurality of user devices 30(1), 30(2), etc., shown in FIG. 1 that are capable of uploading DVR assets. The user device may be in the form factor of a set-top box, and comprises one or more processors 80, a modem 82, a DVR storage unit 84, a network interface unit 86, a display and audio interface 88 and memory 89. The modem 82 performs the receive signal processing of broadcast programs, commands and data received from the HE facility, and transmits upstream signals to the HE facility, including DVR assets to be uploaded in accordance with one embodiment of the techniques described herein. Alternatively, the user device may communicate via the network interface unit 86 over the Internet with the HE facility and related components for purposes of coordinating of and uploading a DVR asset. The DVR storage unit 84 is a data storage device and may comprise or include random access memory (RAM), hard disk drives, writable compact disk read only memory (CD-ROM), optical storage, etc. When the user device records a program using the DVR capability of the user device, the data for that program is encoded and encrypted and ultimately stored on the DVR storage unit 84. As explained hereinafter, space in the DVR storage unit 84 can be freed up after a DVR asset is uploaded because once uploaded to the HE facility, any user device that subscribes to the media distribution network can request and receive (by streaming or download) that DVR asset. The display and audio interface 88 supplies video data for display by a display device or a television, depending on the deployment, as well as audio data for output by an audio system.

The processor(s) 80 executes software instructions stored in the memory 89. For example, the memory 89 stores software instructions for DVR process logic 90 and for client DVR asset upload control process logic 200. The DVR process logic 90 provides the DVR capability for the user device and includes suitable user interface features to enable a user to program the user device to record a desired broadcast program. The client DVR asset upload control process logic 200 enables a user device to coordinate and upload a DVR asset. The operations of the client DVR asset upload control process logic 200 are described hereinafter in connection with FIG. 6.

The memory devices 74 and 89 referred to in FIGS. 2 and 3, respectively, may include ROM, RAM, magnetic disk storage media devices, optical storage media devices, flash memory devices, electrical, optical, or other physical/tangible memory storage devices. In general, these memory devices may comprise one or more computer readable storage media encoded with software comprising computer executable instructions and when the software is executed, the processor that executes that software is operable to perform the operations described herein for the server DVR asset upload control process logic 100 and the client DVR asset upload control process logic 200.

Figure 4A:
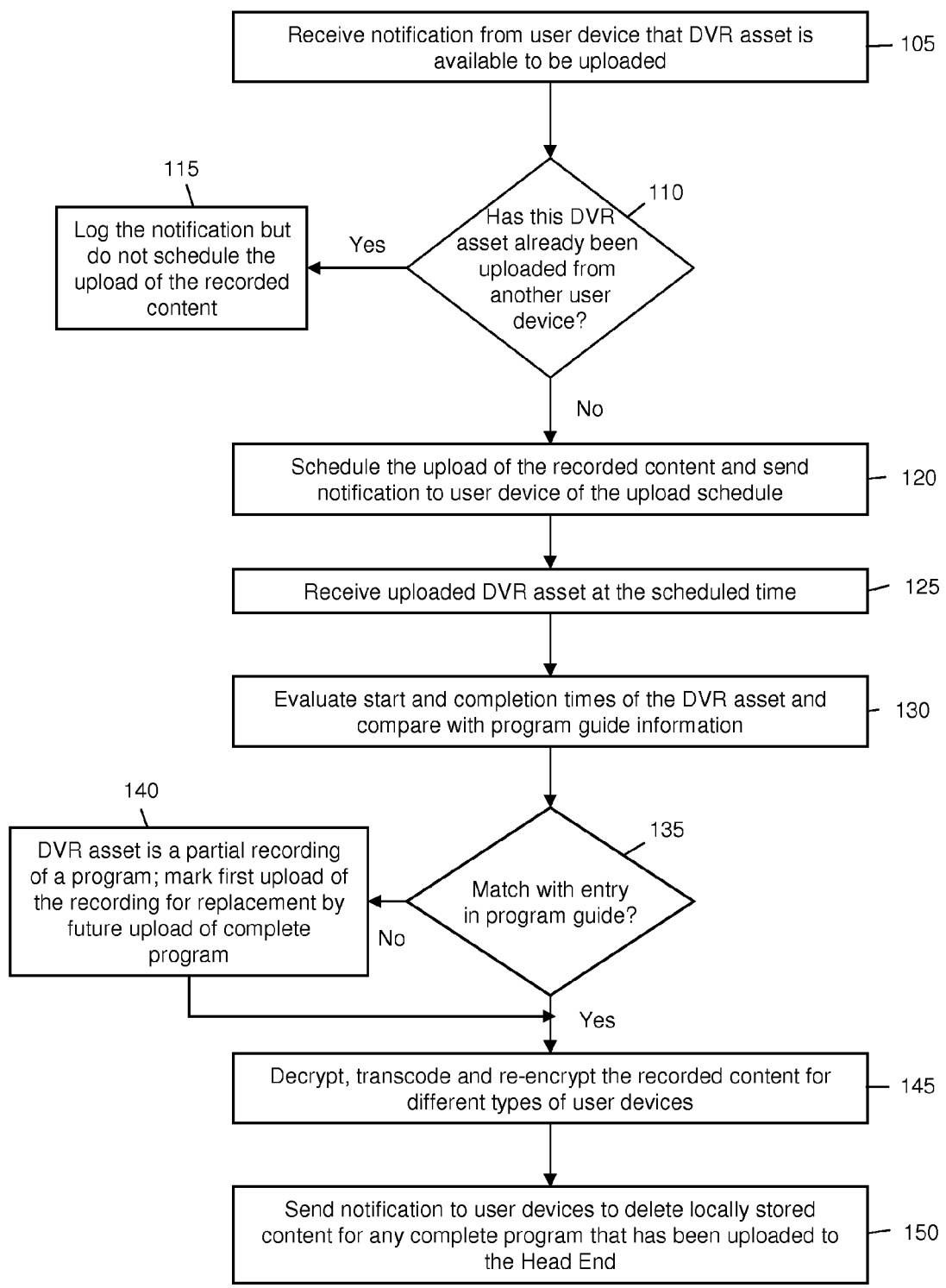
FIGS. 4A and 4B are flow charts depicting operations at the network controller to facilitate uploading of recorded programs from user devices.
Figure 4B:
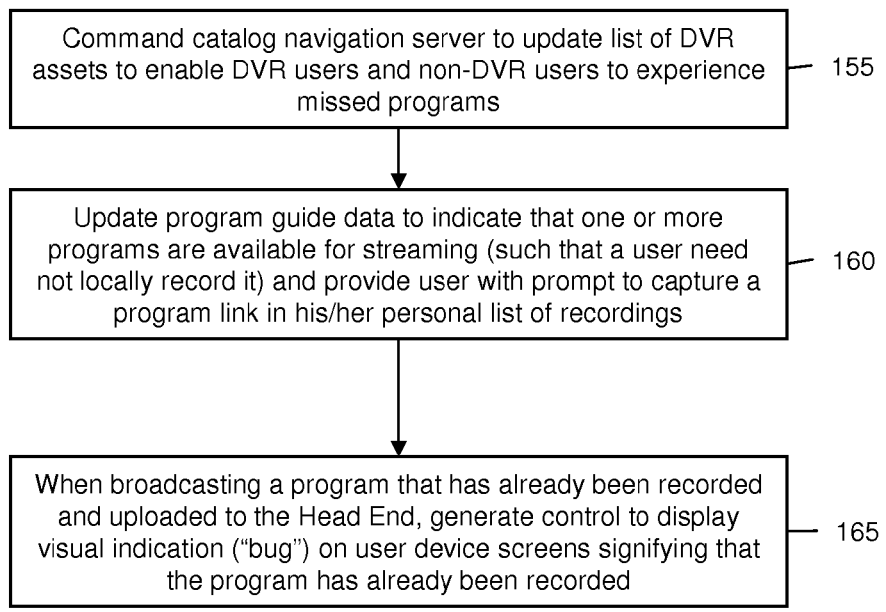

Turning now to FIGS. 4A and 4B, the operations of the DVR asset upload control process logic 100 in accordance with one embodiment are now described. It is useful to also refer to FIG. 1 for purposes of the description of FIGS. 4A and 4B. The DVR asset upload techniques described herein are automatic in that the network controller 52 and the user devices communicate with each other to coordinate the uploading of a recorded program without requiring human (user) involvement at a user device or at the HE facility 20. Once a program has been recorded by a user device, the user device is configured to automatically notify the HE facility 20 that it has a DVR asset to upload. At that point, the network controller 52 will schedule the uploading of the DVR asset, or as explained hereinafter, notify that user device that the particular DVR asset has already been uploaded, in which case the user device need not upload to the HE facility, and furthermore, the user device may delete that DVR asset to free up space on its local storage since it can request streaming of that DVR from the HE facility.

After a user device has recorded a program, the user device sends a notification to the network controller. At 105, the network controller receives this notification indicating that recorded content, e.g., a DVR asset, is available for upload from that user device. The DVR asset may be a broadcast program, such as a television program. The user device is configured to automatically notify the HE facility about a recorded DVR asset (immediately or some time after it has been recorded) to make it available for sharing with that user's/subscriber's alternate devices (cell phone, computer, etc.) as well as other users in the media distribution network. The DVR asset is encrypted by the user device before it is uploaded. In a variation, the notification may be sent after the user has programmed/scheduled the DVR function to record a program or the notification is sent when/while the asset is being recorded. If the recording completes successfully according to the program guide schedule, the DVR function of the user device need provide no further updates to the HE facility. If the recording is interrupted or fails, the DVR function of the user device provides a notification update to the HE facility so that the HE facility cancels a scheduled upload of the DVR asset. In other words, only the scheduling of the recording of a program or the start time of the program triggers the notification to the HE facility. If the recording ends prematurely or fails, a notification update is sent with a timestamp or other information to indicate that the recording failed or ended prematurely.

At 110, the network controller determines whether that DVR asset has already been uploaded from another user device. If the DVR asset has already been uploaded to the HE facility (by a different subscriber from another user device), then at 115, the network controller 52 logs the notification for record purposes but does not actually schedule the upload of the asset. Moreover, at 115, the network controller can send a message to the user device informing it that a recording of the particular program has already been uploaded to the HE facility so that the user can decide to perhaps not to record the program or to keep a copy of the recording if it was already recorded on the user device. On the other hand, if the asset has not already been uploaded, at 120, the network controller 52 schedules the upload at a time or within a time window (e.g., during the evening) when usage of the upstream channel or reverse path is expected to be reduced. The network controller sends a notification to the user device about the scheduled time of the upload. The scheduled time for the upload could be immediately.

At 125, at the scheduled upload time, the DVR asset is received from the user device. The network controller coordinates the upload so that it is uploaded to the content storage server 58 via the DOCSIS upstream channel or via a wireless link, for storage. The network controller may schedule the upload time without waiting for completion of the recording since it knows from the program guide when the program is scheduled to end and can therefore send the upload scheduling information to the user device prior to the end of the program even though the scheduled upload time will be sometime after the end of the program.

At 130, the network controller evaluates the start and completion (stop) times of the uploaded DVR asset and compares this information to start and completion times in a program guide. At 135, if start and completion/stop times of the DVR asset do not match corresponding start and completion times in the program guide, then at 140, the DVR asset is declared to be a partial recording of a broadcast program. If this is the first upload of the DVR asset for that program, the network controller 52 maintains the uploaded data, but marks the DVR asset for replacement (since it is partial recording) so that other users can eventually enjoy the full length recording of the program once the full recording of the program is uploaded. On the other hand, when a match is found at 135, then at 145, the network controller deems the uploaded DVR asset to be a complete recording of the program, and the network controller commands the asset manager server to decrypt the DVR asset (using a decryption key and a suitable encryption/decryption tool, such as the PowerKEY encryption/decryption technology), transcodes it for different types of user devices supported by the media distribution network, and re-encrypts it for storage by the content storage server 58.

At 150, the network controller sends a notification to user devices alerting them to delete any locally stored content that is duplicative of the DVR asset now uploaded to the HE facility. This enables all subscribers to free up storage space on their local storage devices without losing access to that DVR asset since it is available at the HE facility.

Referring now to FIG. 4B, further operations at the HE facility are described. At 155, the network controller generates a command to cause the catalog navigation server 62 to generate/update a catalog of (uploaded) DVR assets that is made available to both DVR-equipped and non-DVR equipped user devices in the media distribution network to allow users to select/request a particular DVR asset. A user who has access to a DVR-equipped user device is a DVR-user and a user who does not or chooses not to use a DVR-equipped user device is a non-DVR user. Put another way, users can obtain access to a DVR asset even if they do not have a DVR-equipped device or wish to view the DVR asset on a non-DVR equipped device. Non-DVR devices on the same account or in the same household as the DVR-equipped device can request streaming of the DVR asset from the HE facility. Also, at 160, the network controller generates a command to cause the catalog navigation server 62 or the broadcast program server 54 to update program guide data to indicate that one or more programs in the program guide are available (as DVR content) at the HE facility for streaming or downloading to a user device, such that a user need not locally record it. Moreover, the program guide may be configured to provide users with a prompt to capture a program link or identifier that is stored in the user's personal list of recordings, even though the DVR asset for that program is not locally stored at the user's device. At 165, the network controller 52 commands or configures the broadcast program server 54, when broadcasting a program that has already been recorded and uploaded, to display a visual indication ("bug") on a user display screen to signify that the program has already been recorded. This visual indication may appear for the entirety of the program or only during an initial portion of the program.

Figure 5:
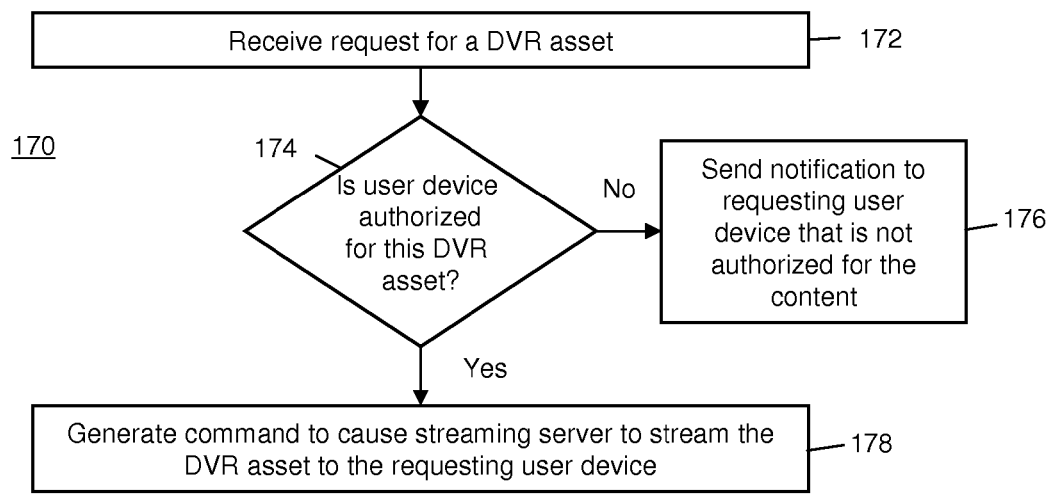
FIG. 5 is a flow chart depicting operations performed at the network controller to stream digital data for recorded program to a user device.

Reference is now made to FIG. 5 for a description of the DVR asset streaming control process logic 170. A user/subscriber can browse a DVR asset library or catalog maintained by the catalog navigation server 62, select a recorded program for streaming, and have that program streamed to one or more of his/her authorized user devices. This process logic 170 is invoked when the network controller 52 receives a request for a DVR asset from a user device. At 172, a request for a DVR asset is received from a user device. At 174, a determination is made as to whether the user device that sent the request is authorized for this DVR asset. Authorization may be based on a variety of factors including current subscription status of the user device, the type or category of the DVR asset including the subject matter nature of the DVR asset. For example, certain user devices that are used by children may be authorized for only a certain type of DVR assets to prevent children from viewing inappropriate content.

If it is determined at 174 that the user device is not authorized for the DVR asset, then at 176, a notification is sent to the user device announcing that it is not authorized. On the other hand, if it is determined that the user device is authorized for the DVR asset, then at 178 a command is sent to the streaming server 64 causing the streaming server 64 to stream the DVR asset to the requested user device, or if so permitted, to download the DVR asset to the user device.

Figure 6:
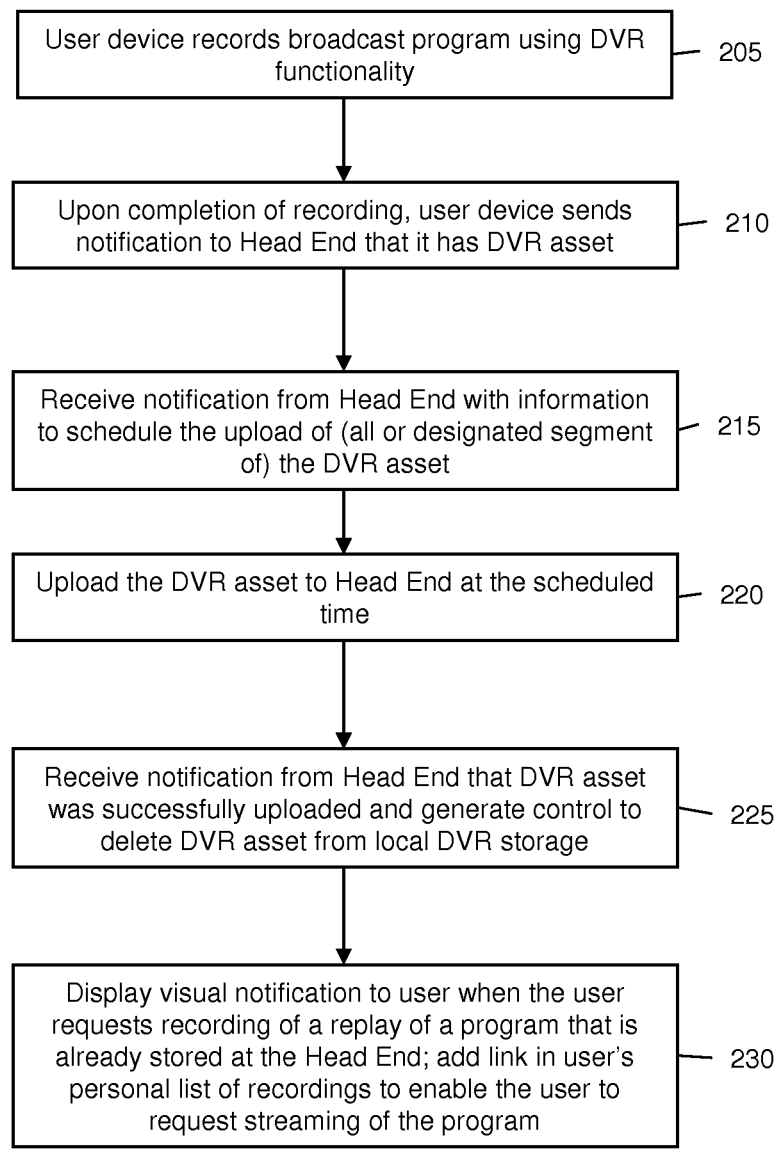
FIG. 6 is a flow chart depicting operations performed at a user device to upload recorded programs to the Head End facility.

Reference is now made to FIG. 6 for a description of the operations of the client DVR upload control process logic that runs in a user device. It is also useful to refer to FIG. 1 for purposes of the description of FIG. 5. At 205, the user device records a broadcast program (which had been transmitted from the HE facility or another broadcast source) using the DVR functionality of the user device. At 210, upon completion of the recording, the user device sends a notification to the HE facility indicating that it has a DVR asset to upload for sharing with other users as well as with that user's alternate user devices (computer, cell phone, etc.). The notification includes information identifying the recorded program, such as the time/date of the recording as well as the start and stop times of the recording. The time/date, start and stop times associated with the DVR asset are useful for the network controller to determine whether that DVR asset is a complete recording of the program and whether it has already been uploaded to the HE facility.

As explained above in connection with operation 105 of FIG. 4A, the user device may be configured to send the notification after the user has programmed/scheduled the DVR function to record a program or while the asset is being recorded, but before the end of the program. If the recording completes successfully according to the program guide schedule, the DVR function of the user device need provide no further updates to the HE facility. If the recording is interrupted or fails, a notification update is sent to the HE facility so that the HE facility cancels a scheduled upload of the DVR asset. Again, in this variation, the scheduling of the recording of a program or the start time of the program triggers the notification to the HE facility. If the recording ends prematurely or fails, the user device sends a notification update with a timestamp or other information to indicate that the recording failed or ended prematurely.

At 215, the user device receives back from the HE facility a notification containing information scheduling the upload of all, or as explained herein in connection with another embodiment, a designated segment of the DVR asset, including identification of the time to initiate the upload. If the HE facility determines that the DVR asset has already been uploaded, then the user device may receive a notification indicating that the particular DVR asset is already in the catalog at the HE facility and need not be uploaded. At this point, the user device may respond and delete its locally recorded copy of the DVR asset since the user device now knows that the DVR asset is already available for streaming from the HE facility. At 220, the user device uploads all or a segment of the DVR asset at the scheduled time interval. The DVR asset that is uploaded may be encrypted prior to its upload, such as by way of a Power Key encryption tool. At 225, the user device receives a notification from the HE facility that the DVR asset was successfully uploaded, and in response, the user device generates a control to delete the locally stored DVR asset from its DVR storage. At 230, when a user requests or configures the user device to record a (replay of) a program for which a recorded DVR asset is already stored at the HE facility, the user device displays a visual indication informing the user that the program is available at the HE for streaming any time. The user device also adds a link in the user's personal list of recordings to enable the user to later request streaming of the program from the HE facility without having to use its local and limited DVR disk space.

As explained above in connection with FIGS. 4A, 4B, 5 and 6, all DVR assets recorded by users/subscribers that are uploaded to the HE facility become available to all authorized subscribers upon request. Users can include in their personal list of records a link for a particular DVR asset maintained at the HE facility for streaming upon request. Even non-DVR users, that is users of devices that do not have DVR capability, can have a personal list of recordings corresponding to DVR assets recorded by other users that were uploaded to and stored at the HE facility.

In accordance with another aspect, to circumvent the somewhat limited DOCSIS upstream or reverse-path transmission rate, a user device may employ a wireless device, e.g., the wireless unit shown at 34 in FIG. 1, to provide for a dedicated wireless channel in a wireless wide area network that uses a high-speed wireless communication standard as explained above. Many now known and hereinafter developed wireless communication standards have a transmission rate capability as fast as 50 Mbps or more that can be used to upload encrypted DVR content to the HE facility. An 8 GB recorded broadcast program takes approximately 18 hours to upload via the 1 Mbps DOCSIS upstream channel, whereas uploading the same DVR asset over a wireless network that uses the Third Generation Mobile Broadband Standard (3GPP), the Fourth Generation (4G) or Long Term Evolution (LTE) would take approximately 22 minutes or less to upload. This would enable DVR users to access content faster from their alternate devices such as computers, tablet computer devices, cell phone devices such as iPhone® devices, and other Smartphones. This would also allow faster access to DVR content for non-DVR users.

Figure 7:
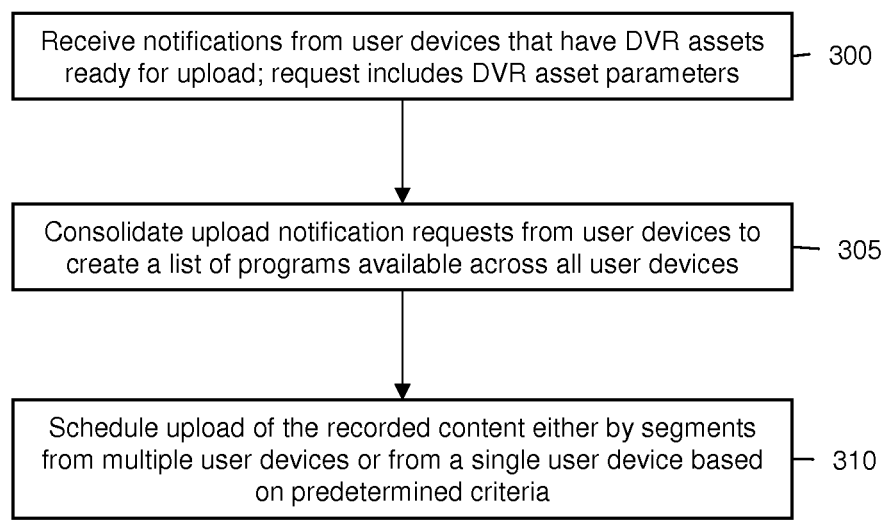
FIG. 7 is a flow chart depicting operations performed at the network controller for a setting up a segmented uploading procedure for a recorded program.
Figure 8:
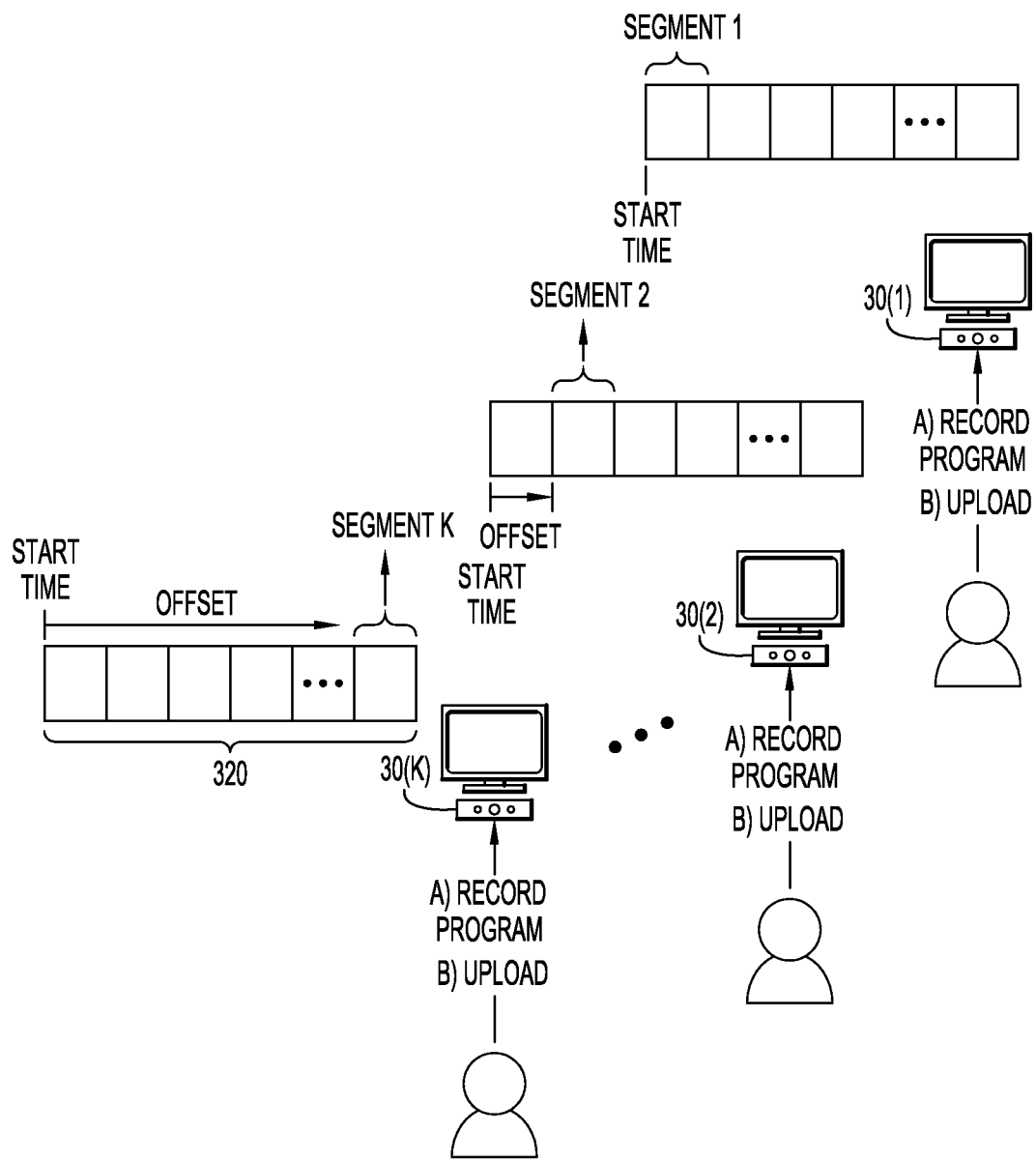
FIG. 8 is a diagram graphically depicting the segmented uploading procedure using multiple user devices that have recorded the same program.

The techniques described herein are a re-architecture of network personal video recording in that it involves moving copies of assets recorded by subscribers to the HE facility for sharing among users. These techniques centralize the management of DVR assets and therefore avoid keeping multiple copies of the same asset at the HE facility. Further still, since the DVR assets are recorded by users, only DVR assets of sufficient interest of users are stored. In so doing, these techniques virtually extend all DVR disk space to include a shared network "cloud" storage at the HE facility. Users of devices that do not have DVR capability can still have access to DVR assets that they did not record, but which other users (with DVR-capable devices) did record. Reference is now made to FIGS. 7-9 for a description of a particular technique for uploading DVR assets. Uploading DVR content to the HE facility for later sharing with authorized users can be relatively slow depending on the upstream channel, especially when a 1 Mbps DOCSIS upstream or other reverse-path channel with relatively poor transmission rate is used. For example, using a 1 Mbps DOCSIS upstream channel, an 8 GB movie would require 18 hours to upload and 9 hours at 2 Mbps. A network glitch or a power outage could require starting the upload over again.

A more efficient mechanism is provided to upload recorded DVR content from multiple DVR devices. The mechanism involves splitting or segmenting a DVR asset into segments or chunks and uploading each segment or chunk of the same DVR asset simultaneously from a corresponding one of a plurality of user devices. The more user devices from which segments are uploaded, the greater the upload transmission speed of a given DVR asset. As a result, a DVR asset for a broadcast program can be uploaded in minutes or seconds as opposed to hours.

Reference is now made to FIG. 7 for a high level description of the operations performed by the server DVR upload control process logic 200 for the segmented upload mechanism. At 300, the network controller receives notifications from DVR recorded content is ready for upload or will be available for upload in the future upon completion of the program (according to the program guide). The requests include recorded content parameters, examples of which include:

Program identifier
    Recording start time offset relative to program start time
    Recording end time offset relative to program start time
    Optional checksum
    Program file size
    Flag indicating complete or partial recording
    Identifier of the source user device that is ready to upload the content At 305, the network controller consolidates upload notification requests from user devices to create a list of programs available across all user devices. At 310, the network controller schedules upload of the DVR recorded content either by segments from multiple user devices or from a single user device, based on predetermined criteria. As an example, the predetermined criteria may be as follows. For less popular (so called "long tail" titles), if the number of notifications (from user devices that have recorded the program title) is less than a certain threshold, such as 1000, the network controller waits for more upload notifications resulting from replays of that broadcast that could be recorded by other user devices, and schedules a segmented upload when the number of source user devices exceeds the threshold. For top program titles, where the threshold would easily be exceeded, the upload requests from multiple user devices that have recorded that title are processed immediately. As explained above in connection with FIGS. 4A and 6, the upload notification requests may be sent to the HE facility as soon as user device schedules the recording of a program (by a user programming or configuring the DVR function of the user device to record a program) or after recording has begun but before completion of the program. In this way, the network controller does not have to wait until the completion of the program to know how many user devices will have recorded copies of the same program available according to the program guide schedule, and therefore it can determine the optimal number of segments for segmented upload and schedule the segmented upload even prior to completion of the program, subject to any unexpected changes due to a recording failure or early termination at one or more user devices for which a notification update requested would be sent to the HE facility as explained above.

Reference is now made to FIG. 8 for a description of the segmented multiple source DVR asset upload process. FIG. 8 shows that there are multiple user devices 30(1), 30(2), . . . , 30(K) each of which has recorded the same DVR asset. The program file for the DVR asset is shown at reference numeral 320. The network controller generates data that describes time segments (time interval portions) also called "chunks" of the DVR asset, such that a different segment is uploaded for each of the user devices. FIG. 8 shows that Segment 1 is uploaded from user device 30(1), Segment 2 is uploaded from user device 30(2), . . . , and Segment K is uploaded from user device 30(K). All of the segments are uploaded substantially simultaneously.

Turning now to FIG. 9 with continued reference to FIG. 8, a flow chart is shown for the operations performed at the network controller to coordinate the multiple user device segmented uploading procedure. At 330, as the network controller is notified about DVR assets that have been created (from recordings of broadcast programs) at user devices or which have been scheduled for recording, it determines whether, for a particular DVR asset, there have been a number of upload notification requests greater than some predetermined threshold. The threshold may be set by the network controller according to various requirements, examples of which are referred to above. The network controller may delay the upload and wait for additional future upload notifications for that DVR asset so that the aggregate number of requests exceeds the threshold.

When the threshold is exceeded, the process continues to 335 at which the network controller determines the optimal number of segments for the DVR asset for the segmented uploading procedure. The optimal number of segments depends on a variety of factors including size of the DVR asset. At 340, the network controller identifies the source user devices from which each segment is to be uploaded and sends a notification to the respective source user devices with segment upload parameters that including: timing offset within the DVR asset program file and size (time duration) for a segment, identifier of the user device from which a corresponding segment is to be uploaded, the upload destination identifier for the uploaded segments (i.e., an identifier or Universal Resource Locator of the content storage server 58), and checksum. The timing offset may identify the beginning of a segment with respect to the start time of the overall program itself. The size of time duration of the segment may be defined in terms of a period of time from the timing offset for that segment. FIG. 8 shows that the timing offset for Segment 1 is 0, whereas the timing offset for Segment 2 is some non-zero period of time and the timing offset for Segment K is also some longer non-zero period of time.

At 345, each user device uploads its segment concurrently with the upload of segments from the other user devices to the content storage server. At 350, the network controller monitors the data uploaded for all of the segments to ensure that they have been successfully uploaded. If necessary, the network controller will identify a "recruit" for a replacement user device as a source if one or more uploaded segments have unrecoverable errors.

At 355, once all of the segments have been successfully uploaded, the network controller sends a command/notification to the video splicer server with an address where the segments for the DVR asset reside (e.g., at the content storage server) and the video splicer server assembles the program file for the DVR asset from the uploaded segments to reconstruct the DVR asset from the segments. At 360, the network controller receives a notification from the video splicer server verifying that the program file for the DVR asset has been assembled. At this point, the DVR asset is made available for streaming or downloading, as explained above in connection with FIG. 5.

As an example, consider an 8 GB video broadcast program that 80 user devices have recorded and want to upload to the HE facility in 80 consecutive segments of approximately 100 MB each. If a DOCSIS upstream channel of 1 Mbps is used, each segment takes approximately 14 minutes to upload over 80 separate DOCSIS upstream (reverse) channels, a dramatic improvement over the 18-hour upload of the entire program from a single user device (over a single DOCSIS channel). In another example, an 8 GB asset divided into 800 segments would result in an upload time of 80 seconds over 800 separate 1 Mbps DOCSIS upstream channels from 800 different user devices. This is particularly useful for top titles/episodes/programs which are the more commonly recorded assets.

In summary, the segmented upload technique breaks up a video program file into chunks or segments that are uploaded concurrently from multiple user devices over multiple upstream channels/reverse paths to dramatically minimize upload time to the HE facility. The number of upstream channels involved depends on the number of users that have recorded the same program and have requested it to be uploaded.

Accordingly, from the perspective of a head end facility, a method is provided that involves receiving a notification from a first user device in a media distribution network, the notification including information indicating recording of a broadcast program at the first user device (either that the program has already been recorded, is in the process or being recorded or is scheduled for recording at some time in the future); determining whether digital data for the recorded program has already been uploaded to the head end facility; sending a notification to the first user device to schedule a time for uploading the digital data for the recorded program to the head end facility from the first user device when it is determined that the recorded has not already been uploaded to the head end facility; receiving the digital data for the recorded program from the first user device at the scheduled time; and storing the digital data for the recorded program.

Similarly, an apparatus is provided comprising a storage configured to store digital data and a controller unit configured to communicate with a plurality of user devices in a media distribution network. The controller unit is configured to receive a notification from a first user device in a media distribution network, the notification including information indicating recording of a broadcast program at the first user device; determine whether digital data for the recorded program has already been uploaded to the head end facility; send a notification to the first user device to schedule a time for uploading the digital data for the recorded program to the head end facility from the first user device when it is determined that the recorded has not already been uploaded to the head end facility; receive the digital data for the recorded program from the first user device at the scheduled time; and store the digital data for the recorded program in the storage unit.

Further still, from the perspective of the head end facility, also provided is one or more computer readable storage media encoded with software comprising computer executable instructions and when the software is executed operable to: at the head end facility in a media distribution network, receive a notification from a first user device in a media distribution network, the notification including information indicating recording of a broadcast program at the first user device; determine whether digital data for the recorded program has already been uploaded to the head end facility; send a notification to the first user device to schedule a time for uploading the digital data for the recorded program to the head end facility from the first user device when it is determined that the recorded has not already been uploaded to the head end facility; receive the digital data for the recorded program from the first user device at the scheduled time; and store the digital data for the recorded program.

From the perspective of a user device, a method is provided comprising sending from the user device a notification to a head end facility associated with a media distribution network, the notification including information identifying a broadcast program that is to be or has been recorded at the user device; receiving from the head end facility a notification indicating whether digital data for the recorded program has already been uploaded; and storing an identifier for the program in a list for a user at the user device for subsequent use in requesting streaming of the digital data for the recorded program from the head end facility when the notification received from the head end facility indicates that the digital data for the recorded program has already been uploaded.

Likewise, an apparatus is provided comprising a modem configured to receive signals including broadcast programs sent over a media distribution network; a data storage unit configured to store digital data; and a processor configured to: generate a notification to send to a head end facility associated with the media distribution network, the notification including information identifying a broadcast program that is to be or has been recorded; receive from the head end facility a notification indicating whether digital data for the recorded program has already been uploaded; and store an identifier for the program in a list for a user at the user device for subsequent use in requesting streaming of the digital data for the recorded program from the head end facility when the notification received from the head end facility indicates that the digital data for the recorded program has already been uploaded.

In addition, a method is provided for efficiently uploading digital data for a recorded program, comprising: at a head end facility in a media distribution network, receiving from a plurality of user devices notifications indicating that digital data for the same recorded program is or will be available for upload from each of the plurality of user devices; generating information to divide the recorded program into plurality of segments; assigning a segment to be uploaded from a corresponding one of the plurality of user devices; sending a notification to each of the plurality of user devices, the notification indicating parameters describing the segment to be uploaded by that user device; and concurrently receiving digital data for the respective segments from corresponding ones of the plurality of user devices.

Similarly, an apparatus is provided comprising a storage unit configured to store digital data; and a controller unit configured to communicate with a plurality of user devices in a media distribution network. The controller unit is configured to: receive from the plurality of user devices notifications indicating that digital data for the same recorded program is or will be available for upload from each of the plurality of user devices; generate information to divide the recorded program into plurality of segments; assign a segment to be uploaded from a corresponding one of the plurality of user devices; send a notification to each of the plurality of user devices, the notification indicating parameters describing the segment to be uploaded by that user device; and concurrently receive digital data for the respective segments from corresponding ones of the plurality of user devices.

The above description is intended by way of example only.

What is claimed is:

1. A method comprising:

delivering media content from a head end facility comprising a cable modem termination system to a plurality of user devices in a media distribution network;

receiving, at the head end facility, a notification from a first user device in the media distribution network, the notification including information indicating recording of a broadcast program included in the media content at the first user device;

receiving, at the head end facility, notifications from a plurality of user devices indicating that digital data for the recorded broadcast program is available for upload from each of the plurality of user devices;

determining, at the head end facility, that digital data for the recorded program has not already been uploaded to the head end facility;

dividing, at the head end facility, the recorded broadcast program into plurality of segments;

assigning, at the head end facility, a segment of the recorded broadcast program to each of the plurality of user devices for upload of the respective segment from the corresponding user device to the head end facility;

sending a notification from the head end facility to each of the plurality of user devices to schedule a time for uploading the respective segment of the recorded broadcast program from the corresponding user device, wherein each notification indicates parameters describing the segment to be uploaded by the corresponding user device;

receiving the digital data for the respective segments of the recorded program at the head end facility from the corresponding user devices at the scheduled times;

storing the digital data for the recorded program at the head end facility;

at the head end facility, decrypting, transcoding and re-encrypting the digital data received from the corresponding user devices for use by different types of user devices supported by the media distribution network to produce re-encrypted digital data; and sending the re-encrypted digital data from the head end facility to the different types of user devices.

2. The method of claim 1, and further comprising receiving a request for the recorded program from a user device in the media distribution network, and streaming the digital data for the recorded program from the head end facility to the user device.

3. The method of claim 2, wherein receiving the request comprises receiving the request from a second user device that is associated with a first subscriber that is also associated with the first user device, and wherein streaming comprises streaming the digital data to the second user device.

4. The method of claim 2, wherein receiving the request comprises receiving the request from a second user device associated with a second subscriber that is different from a first subscriber associated with the first user device, and streaming comprises streaming the digital data to the second user device.

5. The method of claim 1, and further comprising comparing, at the head end facility, the start and stop times of the recorded program to information contained in a program guide, determining whether the start and stop times of the recorded program match information for a program in the program guide, and when it is determined that the start and stop times of the recorded program do not match information for a program in the program guide, storing an indication with the digital data for the recorded program to indicate that the digital data is a partial recording of a program so that it may be subsequently replaced by digital data for a complete recording of a program.

6. The method of claim 1, and further comprising sending to user devices for all subscribers in the media distribution network information indicating that digital data for the recorded program is available.

7. The method of claim 1, and further comprising sending a notification from the head end facility to user devices for all subscribers in the media distribution network to advise them that the digital data for the recorded program is available for streaming.

8. The method of claim 1, wherein receiving and storing are performed for each of a plurality of programs across a plurality of user devices for a plurality of subscribers in the media distribution network, and further comprising generating a catalog listing recorded programs that have been uploaded to the head end facility and which are available to subscribers in the media distribution network.

9. The method of claim 8, and further comprising including in a program guide an indication that a recording for a particular program has already been uploaded to the head end facility.

10. The method of claim 1, and further comprising generating a control to display a visual indication during a broadcast program that signifies that the program has already been uploaded to the head end facility.

11. The method of claim 1, wherein receiving comprises receiving at a head end facility the digital data from the first user device on a reverse channel of the media distribution network.

12. The method of claim 1, and further comprising assembling the digital data for the plurality of segments received from the plurality of user devices to reconstruct the recorded program for storage.

13. The method of claim 1, wherein receiving the notification from the first user device comprises receiving information indicating start and stop times of a broadcast program recorded at the first user device.

14. The method of claim 1, wherein receiving the notification from the first user device comprises receiving information indicating that a broadcast program has been scheduled for recording at the first user device.

15. A method comprising:
at a first user device operable to receive broadcast programs from a head end facility in a media distribution network, sending from the first user device a notification to the head end facility associated with the media distribution network, wherein the notification includes information identifying a broadcast program that is to be or has been recorded at the first user device, and wherein the head end facility comprises a cable modem termination system for delivery of media content to a plurality of user devices in the media distribution network, the broadcast program being included in the media content;
receiving from the head end facility a notification indicating that digital data for the recorded program has not already been uploaded and that the first user device should upload a selected segment of the recorded program to the head end facility, wherein the notification further indicates parameters describing the segment to be uploaded by the first user device and a scheduled time that the segment is to be uploaded to the head end facility;
uploading digital data for the selected segment of the recorded program to the head end facility at the scheduled time;
storing an identifier for the program in a list for a user at the first user device for subsequent use in requesting streaming of the digital data for the recorded program from the head end facility after it is determined that digital data for the recorded program has been uploaded to the head end facility; and
receiving, at a second user device that is a different type of user device than the first user device, re-encrypted digital data from the head end facility, wherein the head end facility decrypts, transcodes, and re-encrypts the digital data for the recorded program for use by different types of user devices supported by the media distribution network.

16. The method of claim 15, and further comprising recording the broadcast program at the user device, and deleting the digital data for the recorded program from storage at the user device in response to receiving a notification from the head end facility indicating that the broadcast program has already been uploaded to the head end facility.

17. The method of claim 15, wherein uploading comprises wirelessly transmitting the digital data for the selected segment over a wireless wide area network.

18. The method of claim 15, wherein uploading comprises transmitting the digital data for the selected segment over an upstream channel in the media distribution network.

19. An apparatus comprising:
a storage unit configured to store digital data; and
a cable modem termination system for delivery of media content to a plurality of user devices a media distribution network;
a controller unit configured to communicate with the plurality of user devices in the media distribution network, the controller unit configured to:
deliver media content from the apparatus to the plurality of user devices in a media distribution network;
receive a notification from a first user device in the media distribution network, the notification including information indicating recording of a broadcast program included in the media content at the first user device;

receive notifications from a plurality of user devices indicating that digital data for the recorded broadcast program is available for upload from each of the plurality of user devices;

determine that digital data for the recorded program has not already been uploaded to the apparatus;

divide the recorded broadcast program into plurality of segments;

assign a segment of the recorded broadcast program to each of the plurality of user devices for upload of the respective segment from the corresponding user device to the head end facility at selected times;

send a notification to each of the plurality of user devices to schedule a time for uploading the respective segment of the recorded broadcast program from the corresponding user device, wherein each notification indicates parameters describing the segment to be uploaded by the corresponding user device;

receive the digital data for the respective segments of the recorded program from the corresponding user devices at the scheduled times;

store the digital data for the recorded program in the storage unit;

decrypt, transcode, and re-encrypt the digital data received from the corresponding user devices for use by different types of user devices supported by the media distribution network; and send the re-encrypted digital data to the different types of user devices.

20. The apparatus of claim 19, wherein the controller unit is further configured to receive a request for the recorded program from a user device in the media distribution network, and generate a command to cause a streaming server to stream the digital data for the recorded program to the user device.

21. The apparatus of claim 19, wherein the controller unit is configured to perform the receive and schedule operations for a plurality of programs uploaded from a plurality of user devices in the media distribution network, and to generate a catalog listing recorded programs that have been uploaded and which are available to subscribers in the media distribution network.

22. The apparatus of claim 21, wherein the controller unit is configured to include in a program guide an indication that a recording for a particular program has already been uploaded.

23. An apparatus comprising:

a modem configured to receive signals including broadcast programs sent from a head end facility over a media distribution network, wherein the head end facility includes a cable modem termination system for delivery of media content to the modem;

a data storage unit configured to store digital data; and a processor configured to:

generate a notification to send to the head end facility associated with the media distribution network, the notification including information identifying a broadcast program that is to be or has been recorded, the broadcast program being included in the media content;

receive from the head end facility a notification indicating that digital data for the recorded program has not already been uploaded and that the user device should upload a selected segment of the recorded program to head end facility, wherein the notification further indicates parameters describing the segment to be uploaded by the user device and a scheduled time that the segment is to be uploaded to the head end facility;

cause the digital data for the selected segment of the recorded program to be uploaded to the head end facility at the scheduled time; and store an identifier for the program in a list for a user at the user device for subsequent use in requesting streaming of the digital data for the recorded program from the head end facility after it is determined that digital data for the recorded program has been uploaded to the head end facility, wherein the digital data for the recorded program is decrypted, transcoded, and re-encrypted at the head end facility so that the re-encrypted digital data may be requested from another user device that is a different type of user device than the user device.

24. The apparatus of claim 23, and wherein the processor is further configured to record the broadcast program at the user device, and delete the digital data for the recorded program from storage at the user device in response to receiving a notification from the head end facility indicating that the broadcast program has already been uploaded to the head end facility.

* * * * *